United States Patent [19]

Navaro et al.

[11] Patent Number: 6,108,560
[45] Date of Patent: Aug. 22, 2000

[54] WIRELESS COMMUNICATIONS SYSTEM

[75] Inventors: William Navaro, Velizy Villa Coublay; Denis Fauconnier, Faint-Remi les Chevreuse; Evelyne Le Strat, Paris, all of France

[73] Assignee: Nortel Networks Corporation, Montreal, Canada

[21] Appl. No.: 08/939,523

[22] Filed: Sep. 29, 1997

[30] Foreign Application Priority Data

Sep. 26, 1997 [EP] European Pat. Off. ............. 97402254

[51] Int. Cl.[7] ................................ H04B 7/00; H04B 1/38
[52] U.S. Cl. ..................... 455/517; 455/550; 455/553; 455/560; 455/561; 370/468
[58] Field of Search ................................... 455/422, 560, 455/561, 550, 575, 577, 68, 69, 70, 552, 553, 557, 67.4, 63, 62; 379/93.08; 370/468, 575; 375/220, 222

[56] References Cited

U.S. PATENT DOCUMENTS

| | | | |
|---|---|---|---|
| 4,924,480 | 5/1990 | Gay et al. | 375/222 |
| 5,438,592 | 8/1995 | Boccuzzi | 375/283 |
| 5,497,396 | 3/1996 | Delprat | 375/220 |
| 5,513,211 | 4/1996 | Yabusaki et al. | 375/219 |
| 5,657,358 | 8/1997 | Panech | 375/356 |
| 5,734,678 | 3/1998 | Paneth et al. | 375/240 |
| 5,812,968 | 9/1998 | Hassan et al. | 704/221 |
| 5,818,871 | 10/1998 | Blanekeny, II et al. | 375/220 |
| 5,825,779 | 10/1998 | Putnins et al. | 370/477 |
| 5,883,897 | 3/1999 | Lin | 370/465 |
| 5,892,802 | 4/1999 | Jung et al. | 375/354 |
| 5,892,811 | 4/1999 | Armbuster et al. | 379/7 |
| 5,920,552 | 7/1999 | Allpress et al. | 370/335 |
| 5,923,761 | 7/1999 | Lodenius | 455/73 |
| 5,963,622 | 10/1999 | Walsh | 379/93.33 |
| 5,974,092 | 10/1999 | Roos et al. | 375/272 |
| 5,974,106 | 10/1999 | Dupont et al. | 375/377 |

*Primary Examiner*—Reinhard J. Eisenzopf
*Assistant Examiner*—Charles N. Appiah
*Attorney, Agent, or Firm*—Lee, Mann, Smith, McWilliams, Sweeney & Ohlson

[57] ABSTRACT

The present invention relates to wireless communication systems and in particular to wireless communication systems which employ coder-decoder means in the transmission of information between two parts of the system. One aspect of the present invention provides method of setting up a wireless communications link between two radio stations which each communicate with a respective base station by the use of a selected one of several codecs; the method comprising: the signalling by each party to the other party of the codecs supported between each radio station and base station by said each party; and selecting an appropriate codec based upon the signalling information, whereby the quality of the link is maximised.

52 Claims, 11 Drawing Sheets

Flowchart part 2 of the TFC

Messages sent using bit-stealing means

State diagram of the Message Transmitter

State diagram of message receiver

Flowchart part 1 of the TFC

Flowchart part 2 of the TFC

Mobile to Mobile and Mobile to PSTN Communications

WIRELESS COMMUNICATIONS SYSTEM

FIELD OF THE INVENTION

The present invention relates to wireless communication systems and in particular to wireless communication systems which employ coder-decoder means in the transmission of information between two parts of the system.

BACKGROUND ART

FIG. 1 shows a diagramatic scenario for a mobile (wireless) phone telecommunications link with a fixed (cable) phone receiver. The figure, for reasons of understanding, is split into a first, lower level which depicts the elements of the communications link, whilst the upper level depicts the processes realised by the elements and the link when a mobile station user employs his mobile station (MS). A microphone inside his mobile station converts speech signals into an analogue electrical signal, which anologue voice signal is transformed into a digital information stream at a rate of N kbits/s. The rate is determined by the particular codec supported (or the particular codec choice) on the mobile station and the compressed speech can be, for example in the case of the GSM system, at full rate, FR, (N=13 kbits/s, ETSI GSM 06.10), half rate, HR, (N=5.6 kbits/s, ETSI GSM 06.20) or enhanced full rate, EFR, (N=12.2 kbits/s, ETSI GSM 06.60). Other processes in turn change this digital signal into a high frequency analogue signal transmitted over the air. After being detected by a base station antenna, this radio signal is processed to recover the digital signal representing speech, which is transported over coaxial cables towards the speech transcoder. From this incoming Nkbits/s input, the speech transcoder derives another digital representation of the speech signal, at a rate of 64 kbits/s (the ITU-T G.711 standard used in fixed network transmission). It is routed through the mobile services switching centre (MSC) and various links and switches in the PSTN until it reaches the local switch to which the fixed cable telephone is connected. Typically, it is here that the analogue speech signal is reconstructed from the digital 64 kbits/s flow, and transported along the subscriber line until it reaches the telephone. An acoustic signal is then emitted by the loudspeaker which the telephone subscriber should recognise as the mobile user's voice.

At the mobile station subscriber's end, the signal can be seen as being transmitted as follows acoustic transmission, analogue transmission, digital transmission at 13 kbits/s (this transmission being performed in two different ways over the radio path and between the base station and the speech transcoder),and finally another digital transmission node in which the speech is represented by a 64 kbits/s signal.

A similar situation occurs in the case of a mobile station (MS1) communicating with a further mobile station (MS2), as depicted in FIG. 2. This situation is broadly similar, except that the audio signal transmitted for MS1 is coded and decoded a second time during the signal transmission from the base station to MS2. This results in double transcoding, compressed speech to 64 kbits/s PCM and 64 kbits/s PCM to compressed speech. This is known as tandem operation.

Tandeming is a well known source of degradation of the perceived quality of vocoded speech. This problem gets more critical, in general, when bit rates decrease. Digitial cellular systems suffer this degradation in mobile-to-mobile calls. Initially, such types of calls were not originally considered to be quite so numerous as has proven to be the case. Mobiles were previously developed primarily as entry points to the PSTN. Tandem free operation (TFO) has been for some years a subject of long discussion in various telecommunications standards committees. Nevertheless, not much work has been carried out on this subject. Recently, interest has grown appreciably, since voice quality is recognised to be a key point of the service provided to the increasing number of subscribers. Ideally, tandem free operation occurs wherein the compressed speech is not converted to PCM, the reduced number of signal representations should reduce transcoded delays and reduce transcoder errors.

64 kbits/s digital coding is well known an input analogue signal is sampled at a rate of 8 kHz, this operation limits the bandwidth for lower kHz. Each sample is given an integer value after the application of a logarithmic compression law known as the A Law or $\mu$ Law according to the region of the world. Each value is coded as an 8-bit symbol. The output rate is 8 kbytes/s, i.e. 64 kbits/s. The transcoding between the analogue signal and its digital A Law representation includes an analogue process, sampling a linear analogue-to-digital conversion of the samples giving a result of 13 bits, and finally a coding process which transforms the 13-bit samples into an 8-bit code.

The effect of the speech transmission methods used in the PSTN and even in ISDN cannot be neglected by the mobile transmission e.g. GSM, since they do not provide a true reconstruction of the original acoustic signal. In both cases, the high frequencies of the signal are filtered out. The lower part of the spectrum is distorted and this can give rise to some undesirable consequences. In the analogue case, the signals below 300 Hz are filtered out, in the digital case this band usually disappears because of the fixed telephone frequency range. The main consequences is that the signal processing differs from a mobile user to a fixed subscriber and vice versa. Typically, because in the mobile scenario the signal is first processed digitally before any distortion is introduced by the network resulting in the transmission quality is better in the mobile to fixed direction.

OBJECT OF THE INVENTION

The present invention seeks to provide a method of improving communications between two subscribers in a communications network.

STATEMENT OF THE INVENTION

In accordance with one aspect of the present invention, there is provided a method of setting up a wireless communications link between two radio stations which each communicate with a base station by the use of a selected one of several codecs; the method comprising: the signalling by each party to the other party of the codecs supported by said each party, and selecting an appropriate codec based upon the signalling information, whereby the quality of the link is maximised.

Preferably the selection of an appropriate codec is made with reference to data, which can be provided in the form of a look-up table. In the instance that the codecs supported are of a common type, tandem free operation can be established. The radio stations can be mobile wireless stations, fixed wireless access stations or both types of wireless station. The base station may comprise a number of base stations linked together by a network.

The look-up table can take into account: the codec presently employed by a radio station in establishing a call, the codecs supported by each radio station, whereby the look-up table can determine which set of codecs should be employed. The look-up table can take into account the relative use of the system whereby the set of codecs determined provide optimal transmission conditions for the presently available resources of the system. Three codecs can presently be used by a GSM mobile. TFO is achievable if both mobiles are using the same codec. In the alternative, when TFO is not possible or sustainable, the codecs employed across a communications link should be such that signal degradation does not arise by the use of two low rate codecs when it is possible to use alternative, higher rate codecs, whereby signal degredation is reduced.

Accordingly, a method of improving communications between two subscribers in a communications network is provided, wherein the preliminary data exchange required for the set-up of a call and the maintenance thereof is reduced. Moreover, the present invention provides a communication link wherein the signal quality is maintained at or around the best signal quality for the given codecs available.

In accordance with another aspect of the invention, there is provided a method of setting up a wireless communications link between two radio stations which each communicate with a base station by the use of a selected one of several codecs, the method comprising the signalling by each party to the other party of the codecs supported by said each party; and selecting an appropriate codec based upon the signalling information with reference to data provided in the form of a look-up table, whereby the quality of the link is maximised.

In the instance that the codecs supported are of a common type, tandem free operation can be established. The radio stations can be mobile wireless stations, fixed wireless access stations or both types of wireless station. The base station may comprise a number of base stations linked together by a network.

In accordance with a still further aspect of the present invention, there is provided a method of maintaining a wireless communications link between two radio stations which each communicate with a respective base station by the use of a selected one of several codecs; wherein the link circumstances have changed, the method comprising: the signalling by each party to the other party of the codecs supported by said each party; and selecting an appropriate codec based upon the signalling information with reference to data provided in the form of a look-up table, whereby the quality of the link is maximised.

In the instance that the codecs supported are of a common type, tandem free operation can be established. The radio stations can be mobile wireless stations, fixed wireless access stations or both types of wireless station. The base station may comprise a number of base stations linked together by a network.

Preferably, the wireless communications link is a GSM link and the selection of an appropriate codec is made with reference to data provided in the form of a look-up table in accordance with table N. The second radio station can be represented by a voice messaging equipment which stores speech data in compressed form. The second radio station can be represented by a compression equipment used to save transmission costs in the PSTN and/or ISDN infrastructure.

In accordance with a still further aspect of the invention, there is provided a system operable to initiate a wireless communications link, comprising first and second radio stations, each radio station operable to communicate with a base station, the two radio stations each being operable to communicate with a respective base station by the use of a selected one of several codecs; wherein, in use, each radio station signals to the other the codecs supported between itself and its respective base station; and an appropriate codec is selected based upon the signalling information, whereby the quality of the link is maximised. There is also provided apparatus operable in this system.

BRIEF DESCRIPTION OF THE DRAWINGS

In order that the present invention can be more fully understood and to show how the same may be carried into effect, reference shall now be made, by way of example only, to the Figures as shown in the accompanying drawing sheets wherein.

Figure 1:
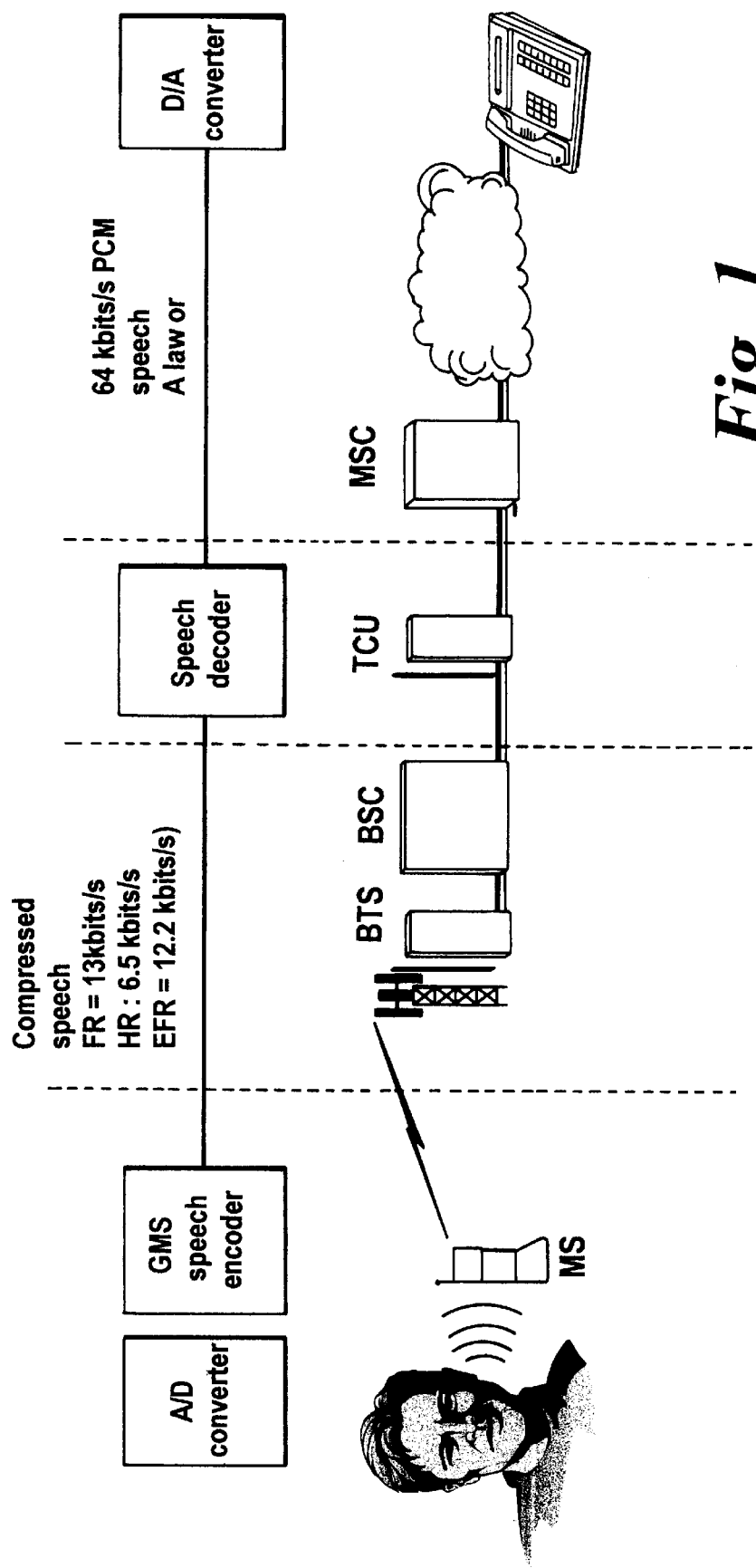
FIG. 1 shows a diagramatic scenario for a mobile (wireless) phone communication with a fixed (cable) phone.
Figure 2:
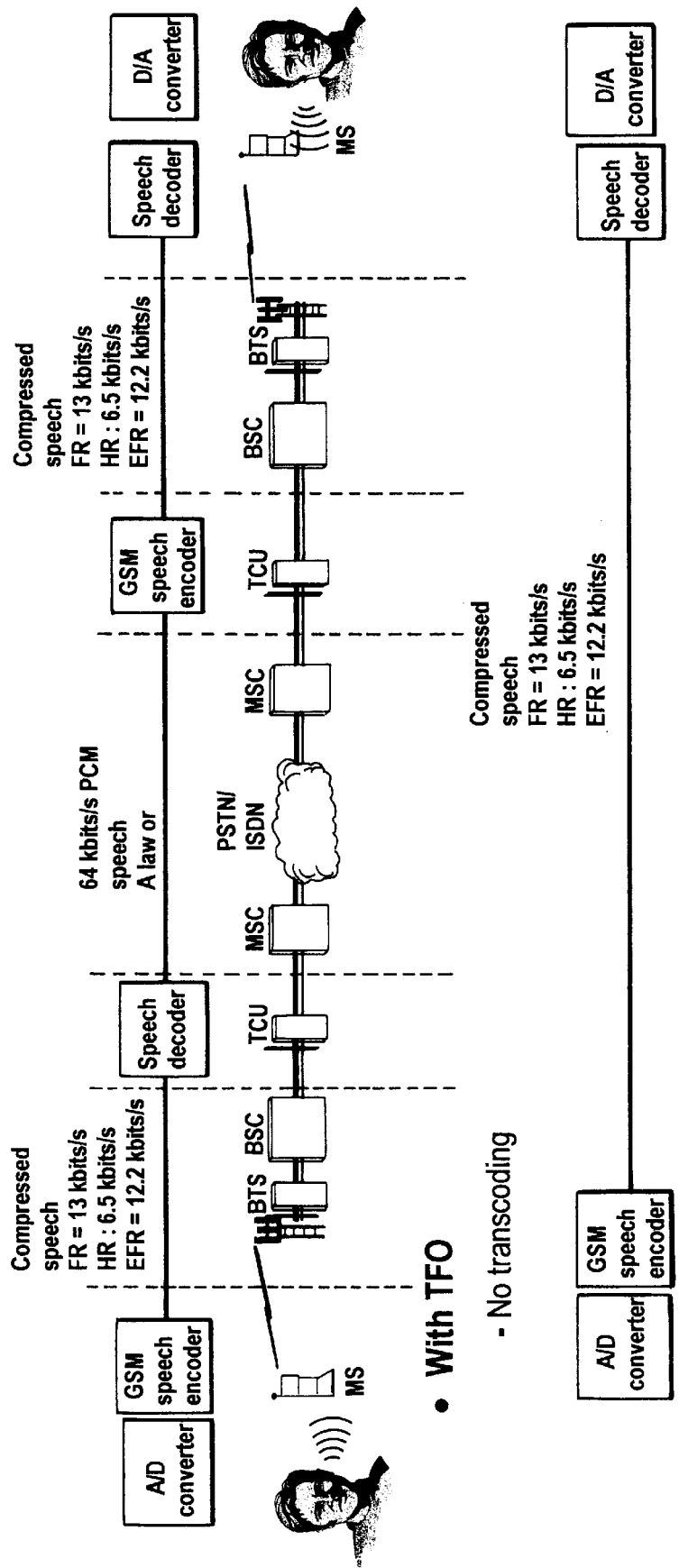
FIG. 2 shows a diagramatic scenario for a mobile station (MS1) communicating with a further mobile station (MS2)

Appendix 1 lists relevant standards referred to within the description.

DETAILED DESCRIPTION OF THE PREFERRED EMBODIMENTS

There will now be described by way of example the best mode contemplated by the inventors for carrying out the invention. In the following description, numerous specific details are set out in order to provide a complete understanding of the present invention. It will be apparent, however, to those skilled in the art that the present invention may be put into practice with variations of the specific.

The aspects of transmission outside a mobile phone have been reviewed above. The inner part of the mobile transmission system extends from a point somewhere in the mobile station, inside the Terminal Adaptation Function equipment (TAF) where speech is an acoustic signal for the speech case and the inter working point between the mobile station and external networks. In the case of GSM, the canonical architecture identifies on one side of the terminal equipment (TE), in direct contact with the user, and on the other, the call functionalities of a mobile station which are common to all services. In between lie the terminal adaptation functions and in addition, for facsimile, the fax adaptor. The piece of mobile station equipment which contains the functions common to all services is called the specifications of the mobile termination (MT).

Along the transmission path, the canonical architecture of GSM distinguishes the base transceiver station (BTS), the base station controller (BSC) and the mobile station controller (MSC). Between the mobile station and the BTS is a clear reference point, the radio interface, where the information crosses the space driving the 900 or 1800 or 1900 MHz electromagnetic waves, (the frequencies allocated to GSM communications). The BTS/BSC/MSC split is adequate for the study of the signalling aspects. However the MSC and the BSC have a small role to play in transmission chain. A further piece of equipment, the transcoder/rate adaptor unit (TRAU), dictinct from the MSC and BSC, has been developed to integrate the functions with the ability to carry 64 kbits/s circuits compliant with the needs of ISDN. Multiplexing is based on a 125 µs cycle, each cycle transporting one octet per circuit. This structure is aimed at the transporting switching of 64 kbits/s circuits, but in addition, enables the transporting of submultiple rates such as 32, 16 or even 8 kbits/s. This possibility is effectively of interest for GSM which does not require connections of more than 16 kbits/s and where the cost of internal terrestrial links between the BTS and BSC and between the BSC and the MSC, usually leased by the operator, represents a substantial part of the operational cost. Accordingly a 16 kbits/s transmission method for user data was devised to allow this cost reduction. However this introduces some delay for the transmission and thus lowers the overall speech transmission quality. Further, it introduces a gateway function at the conversion between 16 and 64 kbits/s.

The first phase of tandem free establishment (phase 1) consists in identifying the type of communication possible e.g. mobile-to-mobile with a distant TRAU supporting TFO or mobile-to-mobile with a distant TRAU not supporting TFO or mobile-to-PSTN. The two latter are actually indistinguishable since it is only the first type of communication that it is possible to have tandem free operation. Further, just because a mobile-to-mobile communication can be established does not necessarily mean that TFO can be established Phase 1 starts when the end of a loop back is detected. Phase 1 continues protection of a mobile-to-mobile link capable of supporting TFO, which involves the use of two transcoders. This part is based on hand checking performance with inband information exchanged by the transcoders according to signalling procedures (which will be described below).

When phase 1 is completed, the second phase (phase 2) starts. This phase aims to ensure bit integrity in the additional path between the two transcoders (if not present) and to reach codec compatibility between mobiles if possible. The compatibility between the two codecs requires the availability in both transcoders of information describing the codecs in use in each mobile and a list of additional codecs accepted by each transcoder. Such information may have already been exchanged in phase 1 of the establishment procedure, or if not available, may require some further exchange of information. Such reception of information is acknowledged by the peer transcoder, as for phase 1. The transmission of information regarding the list of acceptable codecs (supported by the BSS, the mobile and in accordance with the operator's choices) requires some communication means between the TRAU and the BSC. When such communication means does not exist, the list of usable codecs may be indicated as empty. The compatibility search starts by comparison of the codecs presently in use by both mobiles. If they are different then reference data (or look-up table) on a common codec to be used is employed. When such a codec is found, each BSC requires the mobile to hand over to a new codec if the one currently in use must be changed to satisfy the codec compatibility required by TFO. Transcoders must then exchange information regarding the success of implementing the common codec.

The reasons for failing to modify the codec in use are multiple. Such exchange is again acknowledged.

It is to be noted that a transcoder unable to discuss with the BSC, will first indicate an empty list of additional codecs. In this case compatibility between codecs if not originally present can be reached only if the peer TRAU has connection with the BSC and can change its codec to the codec used by the first TRAU. This latter has hence no need to discuss with its BSC to indicate whether a change of codec has been correctly achieved since no modification is needed. Thus the procedures of phase 2 of the establishment are compatible with different BSS implementations. If this phase 2 is successful, that is to say that bit integrity between the TRAUs is ensured and that both mobiles are using the same codec, then tandem free operation can be established.

In TFO established mode, the received TRAU frames from the BTS are transformed into TFO frames. The TFO frames (whose format is described later) is carried in the 2 least significant valid bits of each PCM sample of the PCM links (either E1 or T1). The 5 and 6 remaining bits carry a fixed pattern Such pattern may be used for quick detection of handover and to maintain echo cancellers disabled if present in the path. There are as many TFO frame formats as supported codecs (FR, EFR and HR) TFO frame format is based on the uplink TRAU frame as specified in GSM Recommendations 08.60 for FR and EFR codecs and GSM Recommendation 08.61 for the HR codec. As far as the HR is concerned, the 16 kbits/s submutiplex format is used for TFO frames, whatever rate is used on the BTS-TRAU. The TFO frame format for a given codec is identical to the TRAU frame format except that the timing alignment bits (C6–C11) may be used for TFO control operation purposes. It is expected that in later variants of GSM, more codecs will be supported.

The TFO frame contains hence a synchronisation pattern identical to that of the TRAU frame. Synchronisation is enhanced by the addition of a fixed pattern in the six or five remaining bits of the PCM sample. Synchronisation loss is immediately detected. TFO frames are relayed between the two transcoders. Error concealment and operations due to the eventual activation of DTX at either end are performed in the second TRAU. A TRAU operating in TFO mode continuously monitors the state of the remote TRAU, i.e. checks whether the peer TRAU still operates in TFO mode. This is made by checking the different data fields such as codec type, time alignment as well as the synchronisation patterns. The action taken by the TRAU are scheduled by timers related to the different events such as for example the modification of the codec type field. If an up-link TRAU must fall back to normal mode, the time alignment field C1–C6 is used to inform the peer TRAU that next frames will be true PCM samples. This avoids too long frame replacement.

Figure 3:
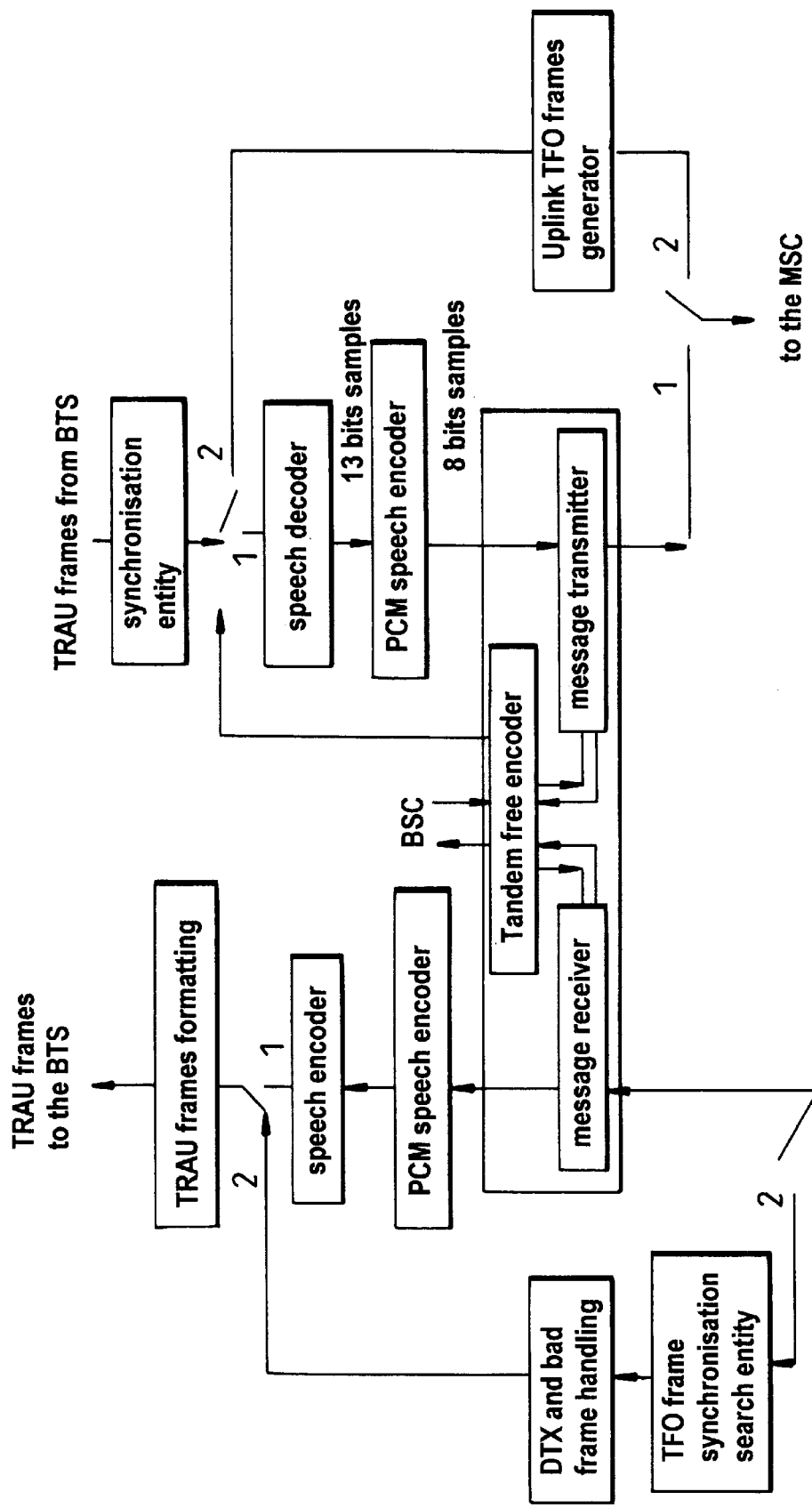
FIG. 3 shows the functional entities taking part in the TFO management.

Tandem free mode is established and the operated by several functional elements to be added to the existing functional elements in a transcoder as described in FIG. 3. Elements in bold characters correspond to the elements required for TFO operation whereas the other elements are the existing elements. The switch in position 1 corresponds to the TFO establishment phase, whereas the switch in position 2 corresponds to the TFO established mode. The switch position is controlled by the tandem free controller (TFC). The tandem free controller manages tandem free both in establishment mode and in established mode. Establishment of tandem free requires the exchange of information between the two TRAU. The transmission and reception is performed by the message transmitter and the message receiver. In tandem free establishment mode it sends commands to the transmitter indicating which message is to be transmitted together with the signalling means to be used (in this case the bit-stealing only as described below). The TFC may as well interrupt the transmission of a given message The TFC also sends commands to the message receiver containing the message(s) to be looked for in the received signal. The TFC receives information from the receiver concerning the detected message or the absence of detection of a given message within a set search time.

The message transmitter sends on request of the TFC, a message (see the list of messages below). In the basic implementation the message is transmitted by bit-stealing. A message has to be fully transmitted at least once. The TFC may send a transmission command to the transmitter before the transmission of the previous message is completed. This means that the message controller has a buffer of messages to be transmitted. The message queue can be managed as a FIFO stack. A given message may be repeated a maximum number of times (this maximum number of times being indicated by the TFC) in the transmission command. The repetition of a message transmission can be interrupted at any moment by the TFC directly or by the reception of a new message transmission command.

A message receiver is instructed by the TFC to detect a list of messages. It may therefore look for several messages at the same time. The detection of a given message may be performed for a maximum time period. As soon as a message is detected or after the detection timer has elapsed, the receiver informs the tandem free controller. Uplink TFO frame generator generates TFO frames from the received TRAU frames. It is activated in TFO established mode only. Whenever the sub-multiplexing rate on the Abis is 8 kbits/s then the TFO frame generator must modify the format. It uses then the 16 bits/s format. In the case the sub-multiplexing rate is 16 kbits/s then the TFO frame generator essentially copies the TRAU frame into the TFO frame. The time alignment field is cleared and may be used for other purposes. TRAU synchronisation search entity is activated only when tandem free is in established mode or is setting up (first TFO frame). The synchronisation entity expects to find the beginning of the synch pattern of the first TFO frame around the bit-position that has been evaluated thanks to the mechanism described in the next section. This entity evaluates the presence of the expected synchronisation pattern. If the synchronisation pattern is not found where expected, a search is conducted for the pattern in the other positions. If synchronisation is lost a timer is started(that may be equal to zero) and the tandem free controller is alerted when the timer elapses. Indeed a loss of synchronisation requires an immediate fall back to non tandem free mode.

In the advertisement for TFO capability, the BSS provides information relating to the fact that it supports TFO, which codec version is used by the mobile and a list of codecs. This information is provided by the BSC to the TRAU at the channel allocation time. That list of codecs corresponds to codecs supported by both the mobile and the BSS. This list may also be restricted taking into account availability of codecs at the moment the message is transmitted and restrictions imposed by the operator (e.g half-rate only due to traffic reasons). In the case that the codecs used by the affected mobiles are different, then some negotiation starts. This negotiation may be implicit or explicit. Since it is highly desirable that TFO be established as soon as possible and that the number of messages between the different GSM entities be as low as possible the reference of a look-up table, which may be stored in many ways, is used to derive the implicit negotiation. The data can be stored by way of a data chip, as will be known to those skilled in the art.

The negotiation consists in applying a rule in both BSS which will result in the choice of a commonly supported codec or to the conclusion that TFO cannot be applied. The rule, takes into account quality and radio resource management. In particular when a HR codec is used it may be due to traffic reasons or a stack of radio resources, in which case changing to a FR traffic channel may not be acceptable for the operator. An example for such a rule is determined by the matrix below.

| Transcoder 1 | | | Transcoder 2 | | | | | |
|---|---|---|---|---|---|---|---|---|
| | EFR FR HR | EFR FR | FR EFR HR | FR EFR | FR HR | FR | HR EFR FR | HR FR |
| EFR FR HR | = | = | T2 = EFR | T2 = EFR | T1 = FR | T1 = FR | T1 = HR | T1 = HR |
| EFR FR | = | = | T2 = EFR | T2 = EFR | T2 = FR | T1 = FR | T2 = EFR | T1 = FR T2 = FR |
| FR EFR HR | T1 = EFR | T1 = EFR | = | = | = | = | T1 = HR | T1 = HR |
| FR EFR | T1 = EFR | T1 = EFR | = | = | = | = | T2 = FR | T2 = FR |
| FR HR | T2 = FR | T2 = FR | = | = | = | = | T1 = HR | T1 = HR |
| FR | T2 = FR | T2 = FR | = | = | = | = | T2 = FR | T2 = FR |
| HR EFR FR | T2 = HR | T1 = EFR | T2 = HR | T1 = FR | T2 = HR | T1 = FR | = | = |
| HR FR | T2 = HR | T1 = FR T2 = FR | T2 = HR | T1 = FR | T2 = HR | T1 = FR | = | = |

Table 1: Look-up Table to determine appropriate codec

For each abscissa and ordinate, the first line corresponds to the codec in use and the second line provides the list of additional supported and accepted codecs. The matrix element indicates the chosen codec if it exists. This table is not complete, for example HR and EFR only entries are missing but is provided as an example, that illustrates look-up table building principles.

After a common codec has been chosen, the BSS attempts to change codec. The result of the codec modification attempt is reported to the peer transcoder. If both transcoders have the same codec then TFO mode can start. Otherwise TFO establishment is not undertaken. It is possible to change the speech codec in the BSS. this procedure is internal to the BSS and can be based on the use of O&M frames on the Abis interface or on the use of a specific TRAU to BSC interface.

Figure 4:
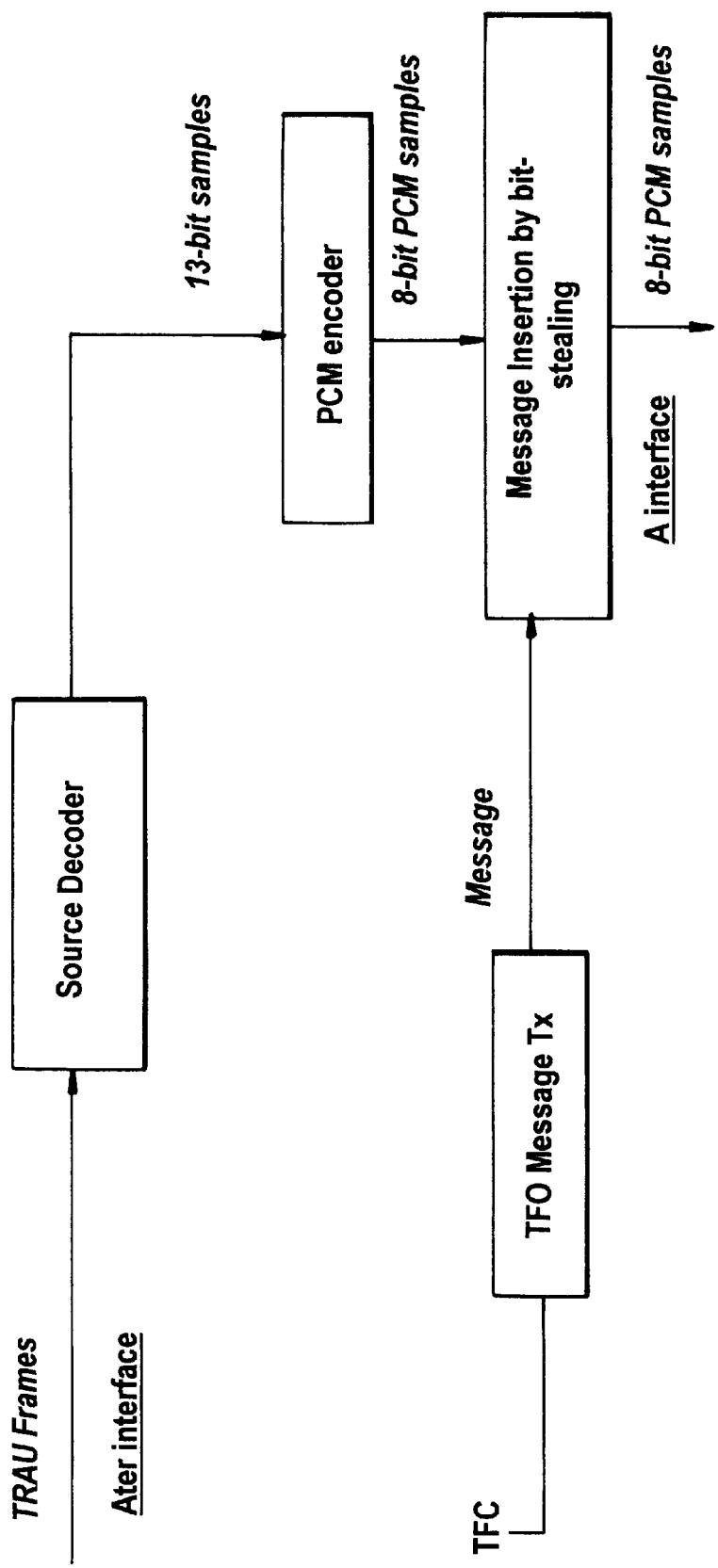
FIGS. 4 shows message transmission using bit stealing means.
Figure 5:
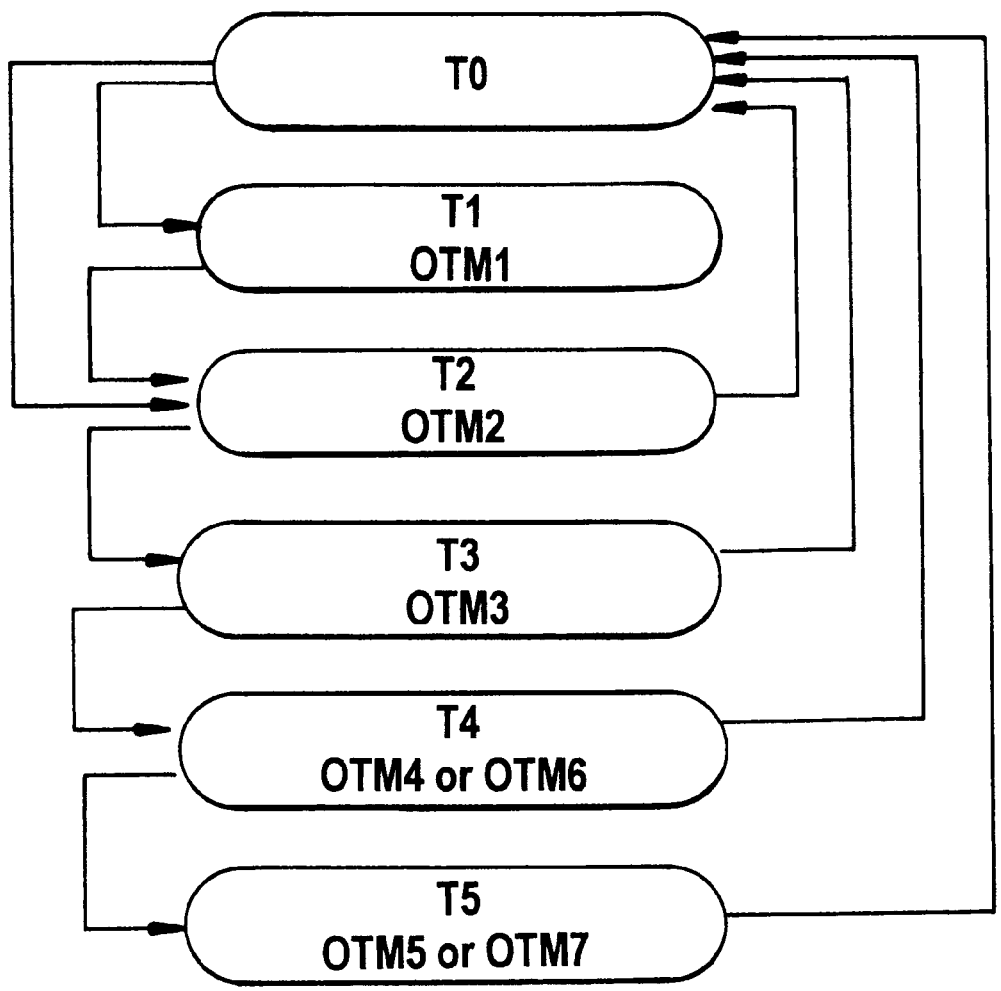
FIGS. 5 shows a state diagram for a message transmitter.
Figure 6:
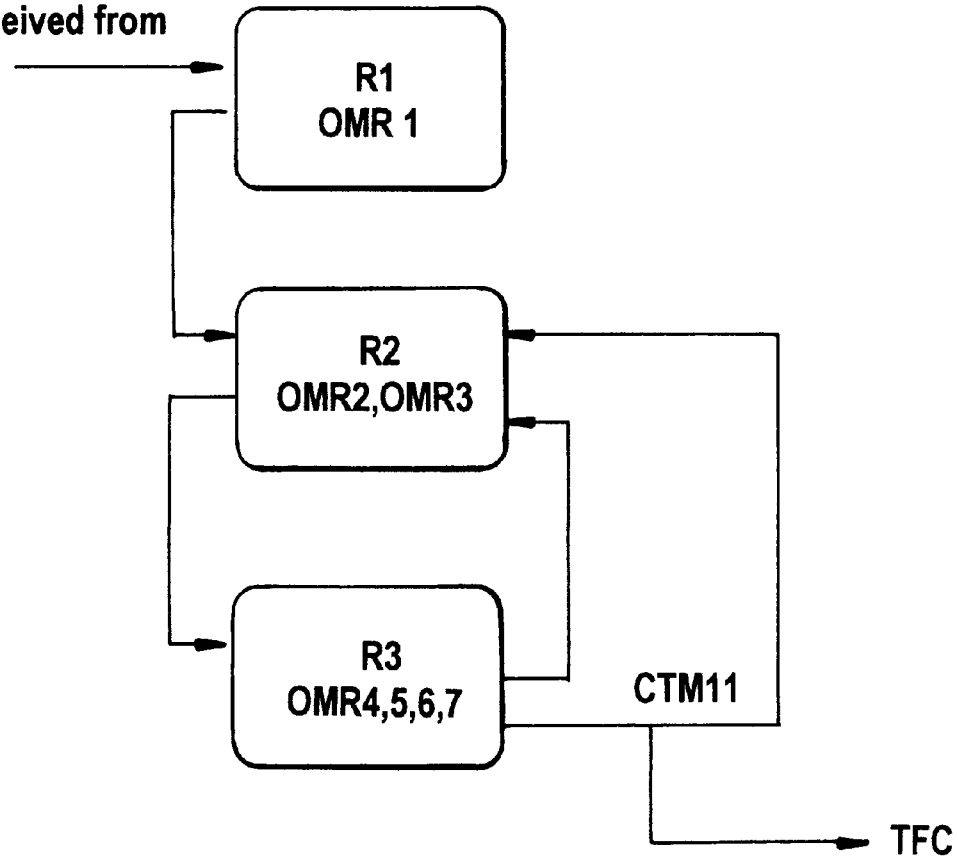
FIG. 6 shows a state diagram for a message receiver.

Bit-stealing is used to send messages on the A interface from a TRAU during the TFO establishment phase. FIG. 4 illustrates where the bit-stealing is performed in the bitstream that circulates within the TRAU. The current configuration used on system offers a 400 bit/s channel. The average SNR between the signal corresponding to the original PCM sequence and the signal corresponding to the degraded PCM sequence is above 30 dB. 400 bps has been found to provide a good compromise in terms of establishment delay and degradation of speech quality which is actually inaudible. This bit-rate could be increased to 800 bit/s if instead of stealing bit 1, bit 0 is stolen. The stealing frequency could then be doubled for the same degradation that is inaudible. As explained elsewhere the higher bit-rate can be used on E1 links for which no data links are used stealing the LSB of some time slots.

Bit-stealing is scheduled as follows: The 20 ms framing of the TRAU frames arriving on the Ater interface is used when inserting a binary sequence on the A interface. The beginning of the binary sequence is either aligned with the beginning of the TRAU frame or with its centre. This facilitates the synchronisation of the downlink TRAU on the TFO frames when TF starts. After the insertion of the first bit, one bit every 10th or 20th PCM word is stolen. In case of the 800 bps channel bit 0 is stolen whilst for the 400 bps channel bit 1 is stolen.

All messages but one (TM1) are composed of three fields:

The message identifier,

The information field which contains data exchanged between the TRAUs,

CRC field which is used to add error detection on the information field.

TABLE 2 summarises the number of bits assigned to each field.

| information element | Length |
|---|---|
| Message identifier | 24 bits |
| CRC | 0–4 bits |
| Information field | 0–19 bits |

Table 2: Format of the signalling messages

The maximum length of the messages hence equals 47 bits, whereas the minimum equals 24 bits if no information is to be conveyed. Depending on the bit-stealing option implemented, the maximum transmission time required is either 59 ms or 118 ms.

The length of the message identifier allows many different messages to be coded. Nevertheless all codes cannot be used, the Hamming distance between two codes must be maximised in order to minimise the risk of bad identification due to errors. So far 6 messages only are required to be transmitted (see Table 3) which leaves some possibilities for further enhancement of the procedures in the future since the transmission of a message can be stopped at any moment due to either a decision of the TFC or due to another reason.

The message sent to detect the end of the loop back (noted TM1) is a purely random pattern generated by the transcoder and it has a fixed length of 32 bits. Bit 0 of every 5th PCM sample is stolen. This length decreases the risk of false detection and the probability that the peer TRAU be using the same sequence. The CRC is used to detect errors of the information field which is variable and may thus take any valid value. The CRC is transmitted in the queue of the binary message. The CRC can be computed on the fly by the message receiver and then immediately checked during its reception.

The TFO establishment can be described by the states of two entities that exchange information between them. These entities are two so-called TFC. In addition to the states of the TFC it is necessary to describe the messages, since transmission and reception of these messages modify the state of the TFC. The states of a Tandem Free Controller may be described by the state of the message transmitter and the state of the message receiver. The state of the message transmitter corresponds to the newest transmission command received from the TFC. The state of the message receiver corresponds to the command received from the TFC, indicating the messages to be detected.

Seven different messages are used in a first TFO scheme:

TM1: Loop-back

TM2: TFO advertisement pattern

TM3: Acknowledgement of reception of TM2

TM4: Successful application of chosen codec

TM5: Acknowledgement of TM4

TM6: Failure of application of chosen codec

TM7: Acknowledgement of TM6

The function of TM1 has already been described, TM2 is used to inform the peer entity that the TRAU is TFO capable, that it is using codec x and that a the codecs listed in the information field could be used. The length of the information field is long enough to allow future extension for new codecs and maybe the different bit rates of a variable bit rate codec. TM3 is sent when TM2 is correctly received and likewise TM5 is sent when TM4 is received and TM7 can be sent when TM6 is received TM4 is used to inform the remote transcoder that the codec selection was successful. TM6 is used to inform the remote transcoder that the codec to select indicated by the implicit rule has failed.

The format and the number of bits per field of each message are provided in table 3.

| List of messages | message identifier | recognition pattern | CRC | information element length | information element content |
|---|---|---|---|---|---|
| TFO advertisement pattern | TM2 | 24 | 4 | 19 bits | 19 bits are organised as follows: 4 bits: applied codec 15 bits: other codecs accepted |
| Acknowledgement of TFO capability | TM3 | 24 | 0 | 0 bit | 0 bit corresponds to a simple ack. |
| Successful application of chosen codec | TM4 | 24 | 0 | 0 bits | 0 bit corresponds to a simple ack. |
| Acknowledgement of successful application of chosen codec | TM5 | 24 | 0 | 0 bit | 0 bit corresponds to a simple ack. |
| Failure of application of chosen codec | TM6 | 24 | 0 | 0 bit | |

-continued

| List of messages | message identifier | recognition pattern | CRC | information element length | information element content |
|---|---|---|---|---|---|
| Acknowledgement of failure of codec application | TM7 | 24 | 0 | 0 bit | |

Message transmitter states

The states of the message transmitter are the following:

T0: The message transmitter is not activated.

T1: The message transmitter is activated and is instructed to transmit the end-of-loop back pattern (TM1).

T2: The TFC attempts to establish the TFO mode. The message transmitter is instructed to transmit its advertisement pattern (TM2).

T3: The TFC has been informed by the message receiver that the remote transcoder supports TFO. The transmitter is instructed to send, as soon as possible, the TFO acknowledgement pattern (TM3).

T4: Compatibility check performed by the TFC indicates incompatibility but a common codec can be found. The negotiation procedures is thus enabled. After negotiation is completed, the transmitter message transmitter is commanded to indicate whether the results of the negotiation have been successful or not ( TM4, TM6).

Figure 7A:
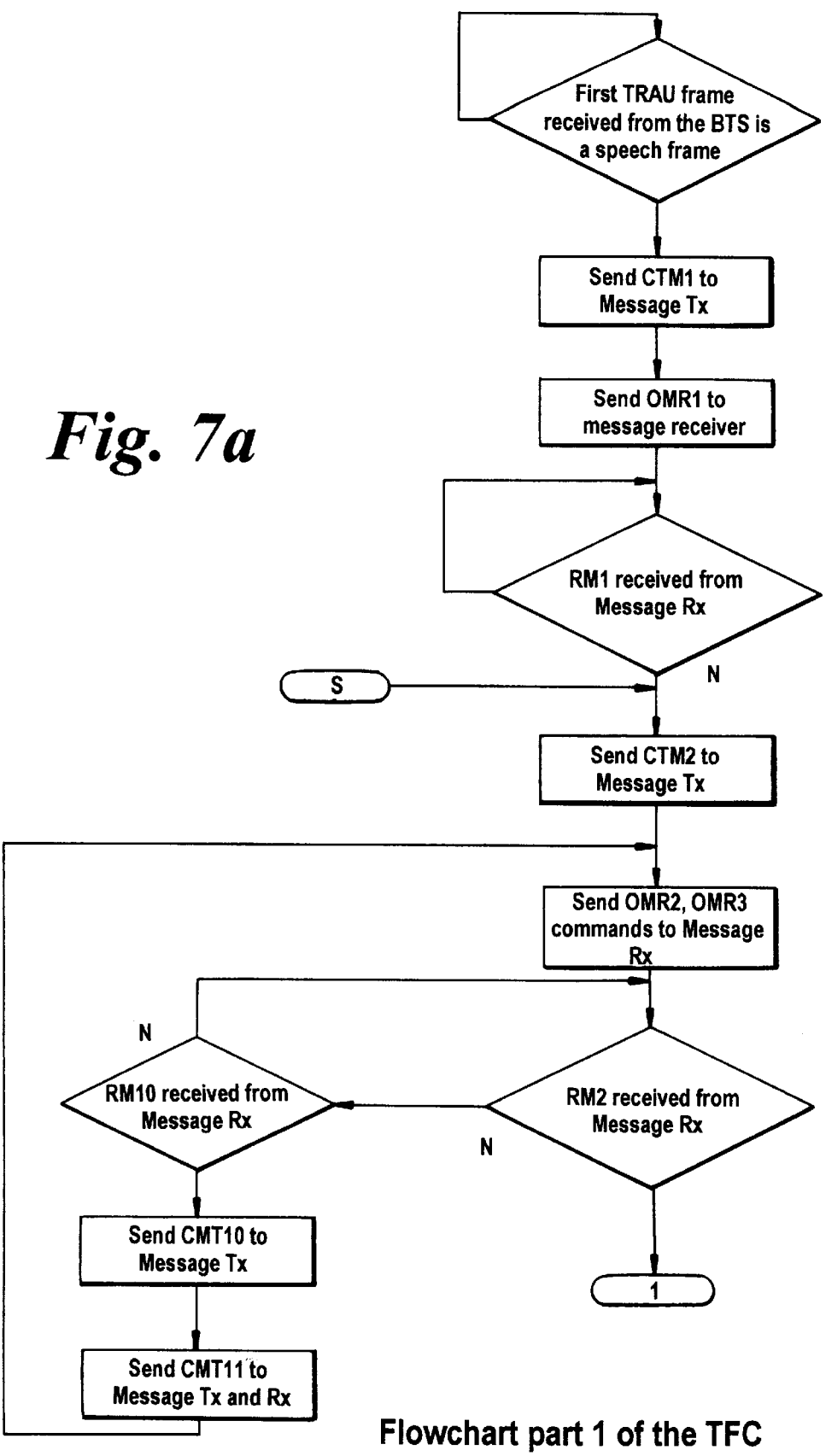
FIGS. 7a and b show a flowchart of the operation of the tandem free controller.
Figure 7B:
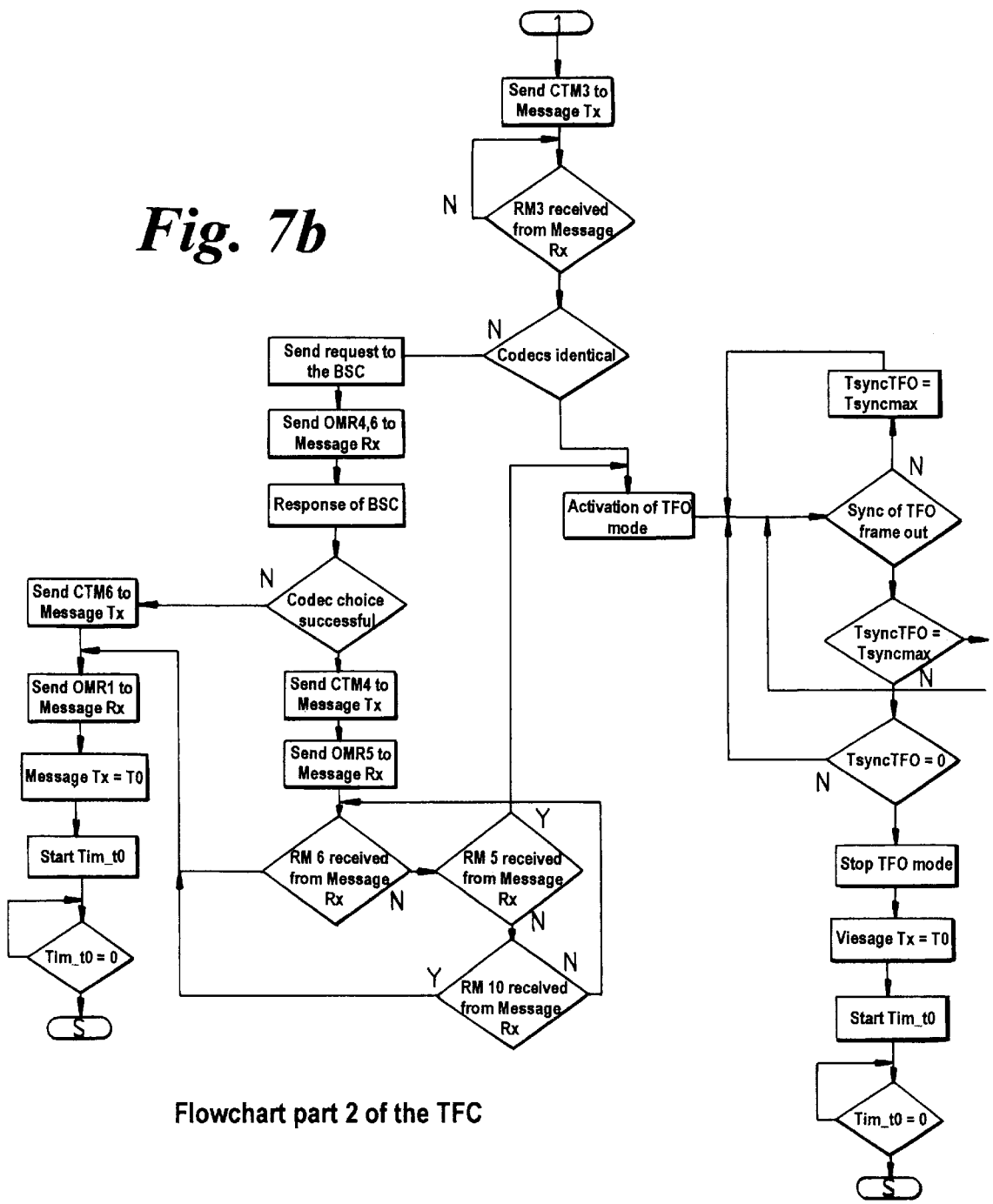

T5: The TFC being informed by the message receiver of the results of the negotiation of codecs commands the message transmitter to acknowledge the success or failure of the codec change in the remote TRAU (TM5, TM7). Actually if the remote TRAU reports a failure, the TFC can stop the establishment procedure as shown in FIG. 7b.

It must be noted that there is only one transition from state T0 to T1. This means that once the end of loop back is detected there is no more attempt by a TFC to trigger this event. When the message transmitter has returned to state T0, periodically it goes to state T2 on request of the TFC, i.e. it sends the advertisement pattern. The commands sent by the TFC correspond to the message transmission commands, interruption of transmission of some messages (triggered by message detected by the receiver). The command noted $CTM_i$ corresponds to the transmission of the messages $TM_i$ apart from CTM10 which corresponds to the interruption or cancellation of the transmission of an indicated message and CTM11 which deactivates the transmission.

Message receiver states

R1: The message receiver is instructed to detect the absence of the random pattern for the end of loop back.

R2: The receiver is instructed to detect the TFO advertisement pattern and the acknowledgement of the advertisement pattern (TM2, TM3).

R3: The message receiver is instructed to detect the results of negotiation of codecs and the acknowledgement of the negotiation (TM4, TM5, TM6, TM7).

Indications sent by the message controller to the tandem free controller are noted RMi. They correspond to the successful detection of some message ($RM_i$ corresponds to the detection of $TM_i$), the failure of detection within a limited period of time (RM10). The overall operation performed by the TFC is shown in FIGS. 7a and 7b. FIG. 7a up to point S illustrates operations performed until the end of the loop back is detected. The remaining part of FIG. 7a illustrates operations in phase 1 of the tandem free establishment until the TFO advertisement pattern is received from the peer TRAU or the reception timer expires. The left side of FIG. 7b illustrates the remaining operations taking place at end of the phase 1 (reception of the acknowledgement of the TFO advertisement pattern sent by the peer TRAU) and the operations required to reach codec compatibility in phase 2. The right side of FIG. 7b illustrates the operations in tandem free established.

The TRAUs exchange TFO frames when the TFO mode is established. The TFO frames are very close to the TRAU frames. Nevertheless some control bits have to be modified. In case of use of 8 kbits/s submultiplex on the Ater interface a rate conversion is performed. This means that the synchronisation patterns must also be converted.

There are two possibilities for the conversion of TRAU frame into TFO frame. We favour the conversion in the downlink TRAU. This enables this TRAU to know what the other TRAU is supposed to do. We present here the different conversions both for 16 kbits/s and 8 kbits/s submultiplexes.

Case 1: 16 kbits/s submultiplex:

Uplink TRAU frame to TFO frame:

The frame type remains unmodified.

The Time Alignment field is cleared. "Not used" codes as defined in GSM

Recommendations 08.60 and 08.61 are used if specific information must be sent to the remote TRAU.

BFI and UFI remain unmodified.

SID remains the same.

TAF remains the same.

DTX downlink indicator remains unmodified.

TFO frame to Downlink TRAU frame:

The frame type is converted to downlink code for FR and HR.

The time alignment is cleared (no change in frame timing).

SID is set to the downlink DTX management (see section 6.)

TAF is set to Spare (binary 1).

SP is set to 1 or 0 according the downlink DTX management (see section 6).

UFE is set to 0 or 1 according to the detection of errors in the local uplink TRAU frames.

DTX downlink indicator is set to Spare value (binary 1)

Case 2: 8 kbits/s submultiplex

The uplink TRAU frames are in this case buffered up to the last CRC bit that can be found in such frames. Then the conversion can be made.

Uplink TRAU frame to TFO frame:

C1–C5 The odd parity bit is checked and it it is false the TFO previous frame is sent, frame type of TFO frame is set to Uplink HR.

C6–C8: These bits are not taken into account. Time Alignment of TFO frame is handled as for 16 kbits/s submultiplex.

C9: DTX downlink indicator of TFO frame is a copy of this bit.

XC1–XC6: The odd parity is checked and handled as for C1–C5. The extended control bits are examined to extract the BFI, UFI, SID and TAF.

CRC0–CRC2: The CRC is checked, if an error is found UFE of a downlink TRAU will be set to 1.

TFO frame to Downlink TRAU frame:

Bits C1–C5 set the speech frame code
Bits C6–C9 are set to spare (binary 1)
Bits XC1–XC6 are set according to the downlink DTX management (see section 6)
CRC0–CRC2 The CRC is computed and inserted in the TRAU frame.

Mapping of the TFO frame on the PCM samples of the A interface

As explained in section 4 there exists two kinds of PCM links. One of them, the T1, may modify the LSB. That's why we propose two different mappings that are shown in Tables 4a and 4b.

TABLE 4a

Mapping for an E1 link

| b7 | b6 | b5 | b4 | b3 | b2 | b1 | b0 |
|---|---|---|---|---|---|---|---|
| Fp5 | Fp4 | Fp3 | Fp2 | Fp1 | Fp0 | TFO | TFO |

TABLE 4b

Mapping for a T1 link

| b7 | b6 | b5 | b4 | b3 | b2 | b1 | b0 |
|---|---|---|---|---|---|---|---|
| Fp4 | Fp3 | Fp2 | Fp1 | Fp0 | TFO | TFO | X |

The fix pattern has one bit less for T1 than E1, but it is believed that in practice this won't after the robustness of the synchronisation and of the identification of TFO frame for the T1 links.

In the scheduling of the process and synchronisation management, in the establishment mode, the end of loopback is detected as soon as one bit differs in the received sequence. It may be preferred to check the difference on more bits. The minimal time resolution of the detection of the end of loop back is the time needed for receiving 5 PCM samples i.e. 625 μs.

The transmission of a message is repeated continuously whatever it is. Its transmission is stopped either when an acknowledgement to this message is received from the remote TRAU, or whether a new message must be transmitted, or when a timer Tack_mess which has been started at the end of the first transmission expires. The acknowledgement messages are thus sent continuously until the expiration of Tack_mess.

As described before, the beginning of the messages are aligned either with the beginning of the TRAU frame or with its center. This can delay by up to 10 ms the transmission of a message. In the established mode, the first TFO frame is sent after the last PCM sample corresponding to the last decoded TRAU frame has been transmitted over the A interface. The time alignment requests of the BTS are ignored. This means that the TRAU frames arrive at the BTS with the timing imposed by the CCU of the Uplink BTS. The synchronism of the TFO frames is continuously monitored on the A interface. When synchronisation is lost as already explained the timer TsyncTFO is started. If no re-synchronisation is achieved before TsyncTFO expires, the TFO is stopped.

Tandem Free means that the speech encoded by one mobile is received by the other mobile without interference in the transmission. Of course some errors can be introduced in the radio transmission but GSM system has been designed to cope with such a phenomenon and reduces as far as possible the number of errors. The TRAUs must act as seamless repeaters of the information carried by the frames of encoded speech (the TRAU frames). The encoded speech received on the A interface by a TRAU cannot suffer any degradation. This would make the synthetic speech very noisy and in the worst cases totally unintelligible.

This means that tandem free is possible if there's no modification of what is being exchanged between the TRAUs. The A interface as well as the inter MSC links and the PSTN's backbone use 64 kbits/s PCM links. Sometimes it may happen that an analogue line is used. In this case we can forget the TFO. This does not mean that if digital lines are used TFO will automatically be successful. As a matter of fact, as explained above, TF supposes that an error free digital channel must be established between the TRAUs.

Figure 8:
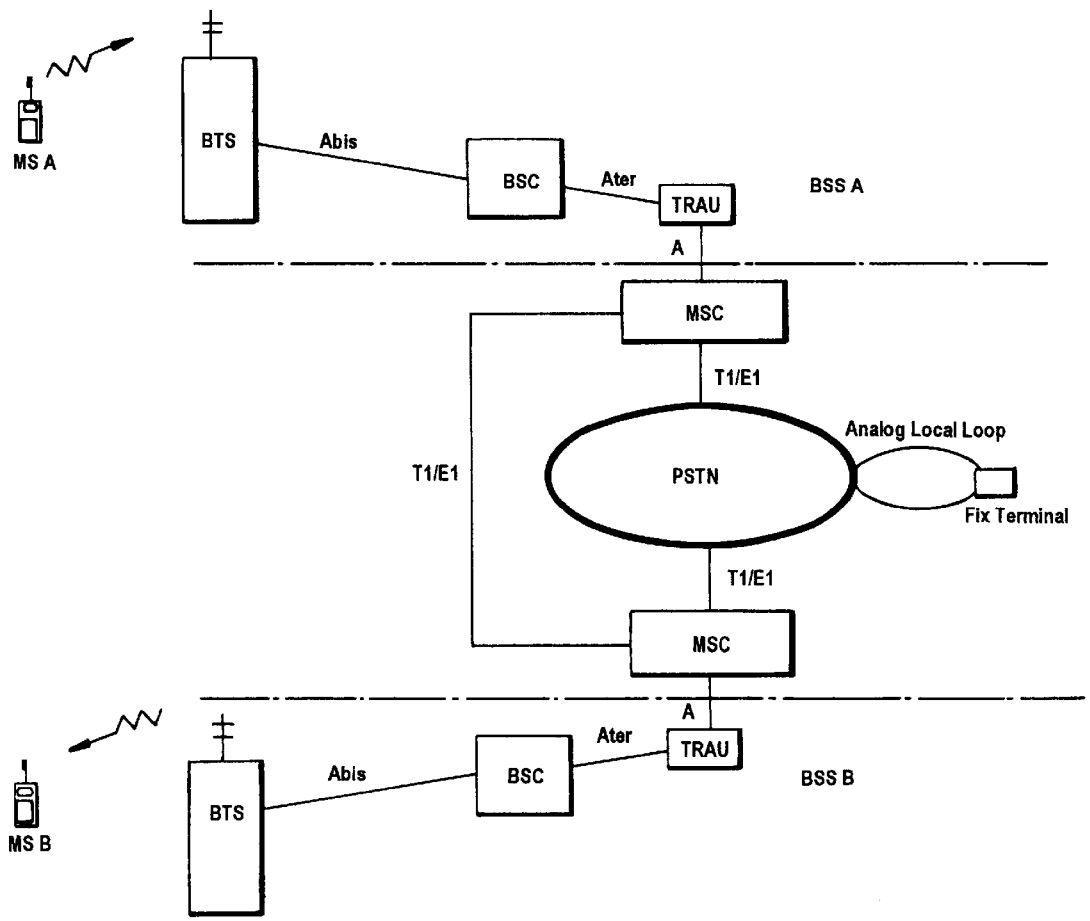
FIG. 8 shows a typical scenario of mobile to mobile and mobile to PSTN communications.

FIG. 8 illustrates both a mobile-to-mobile call and a mobile-to-PSTN call. It also represents the different paths a communication between to mobiles can take. An ordinary call is supposed to be between a Mobile Station and a fixed terminal within the PSTN. The fixed terminal is connected to a PSTN switching centre through an analogue local loop. The analogue local loop on the switching side uses a four-wire connection while it's a two-wire connection on the terminal side. A hybrid circuit is used to interconnect the two-wire and four-wire parts of the loop. The impedances may be unbalanced and thus produce electrical echo. The GSM loop in the transmission adds around 190 ms in the round trip delay This means that the echo can be very annoying if its level is too high. For this reason, an Electrical Echo Canceller (EEC) can be located at the MSC site to process the incoming PSTN lines.

A mobile-to-mobile call can be routed through the PSTN as shown in FIG. 8. The MSCs are unlikely to identify which kind of terminal is originating the call if the mobile is not connected to the same PLMN. This frequently leads to the switching-on of the echo cancellers on the incoming line; even in mobile-to-mobile calls echo cancellers may be used. When echo canceller are used, there is no guarantee that the digital content of the PCM links is preserved. This provides a basic barrier that prevents the exchange of messages by bit-stealing and in any case the exchange of TFO frames. Furthermore, in the network, echo suppressers (e.g. G.164 type C) may exist and, accordingly, if such equipment is functioning in the communication path, then the digital content is modified.

Most of the echo cancellers and suppressers can be disabled either by an inband or an outband signal. The inband signal consists of a 2100 Hz tone. This is described in CCITT Recommendations G.164 (echo suppressers), G.165 (echo cancellers), V.2 (Power Levels) and V.25 (Disabling procedure). This tone must incorporate phase inversions every 450 ms to disable echo cancellers (not needed for echo suppressers).

This tone following V.25 must be sent 3.3 s+/–0.7 and must be followed by a silence of 75 ms +/–20 ms. The level of the tone must be –12+/–6 dBm0. This same tone is supposed to be less than 400 ms long to be detected following Recommendations G.164 and G.165. Nevertheless the requirement on the silence duration that enables back the echo processing equipment is the same. The V.25 values are very conservative and are applicable to the Analogue systems.

Observations have shown that 1.5 s is sufficient to disable all the EECs and EESs used on digital networks. A minimum signal level of –36 dBm0 must be maintained on the line with silences of less than 100 ms in order to keep the echo cancellers and suppressers in disabled states. Such a signal disables all the active echo cancellers/suppressers in both directions.

The detailed description that follows makes explicit reference to the stage 2 service description for Tandem Free Operation (TFO) in GSM, but the TFO principles are such that they could be equally well suited to systems other than GSM. Further, in the presently agreed revised standard of GSM, Tandem Free Operation applies only to speech calls. It is to be understood that the present invention is not to be construed as being limited to speech calls and the principle may be applied to all types of data traffic.

GSM Stage 1 is an overall service description, from the service subscriber's and user's standpoints, that views the network as a single entity which provides services to the user. Stage 2 identifies the functional capabilities and information flows needed to support the service described in stage 1 Furthermore, it identifies various possible physical locations for the functional capabilities. The output of Stage 2, which is signalling system independent, is used as an input to Stage 3, which defines the signalling system protocols and switching functions needed to implement the service described in stage 2.

Figure 9:
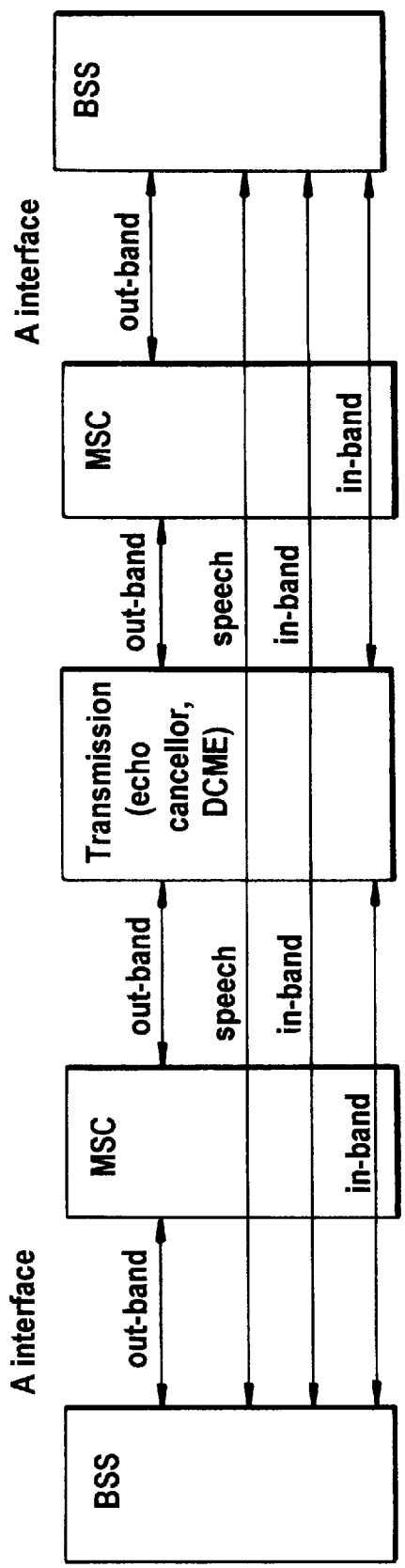
FIG. 9 shows the BSS reference points for TFO.

The BSS reference points for TFO are described in FIG. 9. GSM A interface reference point applies here with the exception that speech is not in the standard 64 kbits/s PCM format and between TFO TRAUs in-band signalling is used. For speech and in-band signalling the MSC is transparent Additional transmission equipment is taken into account, such equipment being operable to process the PCM signal between the two peer BSS, e.g. echo cancellers, DCME. The BSS to BSS transmission is then considered transparent provided no transmission equipment along the circuit modifies the 2 LSB or the transmission equipment implements a TFO "transparency mode". A specific signalling allows the remote control of in-band equipment. BSS-MSC out-of-band signalling consists in this version of TFO of the normal BSSMAP signalling which carries the list of acceptable speech codec that may be used for the TFO negotiation mechanism.

In TFO establishment mode, one bit out of 16 LSB bits is regularly stolen from the 64 kbits/s circuit. This provides for an 0.5 kbits/s channel and provides that the degradation on the speech quality is inaudible. In TFO established mode and when the FR or EFR codec is used, bit stealing takes place on the 2 LSB bits (bits 7–8) on each PCM sample. This provides for a 16 kbits/s channel that allows vocoded speech to be carried in TFO speech frames which are similar to the frames in GSM 08.60. The contents of the 6 MSB (bits 1–6) is normal A/µ-law information. In TFO established mode and when the HR codec is used, bit stealing takes place on the LSB bit (bit 8) on each PCM sample. This provides for a 8 kbits/s channel that allows to carry vocoded speech in TFO frames which are similar to the 8 kbits/s frames in GSM 08.61. The contents of bit 1–7 is normal A/µ-law information.

The high level functions which apply to TFO are described hereafter. The list of functions which are applicable to the BSS follows signalling a request message (TFO_REQ) on the A interface that the TRAU supports TFO signalling an acknowledgement message (TFO_ACK) that the request message has been received from the peer entity monitoring request and acknowledgement messages on the A interface that the peer entity supports TFO remote control of echo cancellors, DCME, signalling of current speech codec with acknowledgement message signalling of speech codec capability with acknowledgement message change of current speech codec within the BSS (optional)

sending of TFO speech frames to the A interface reception of TFO speech frames from the A interface conversion of a flow of TRAU frames into TFO speech frames conversion of a flow of TFO speech frames into TRAU frames The following functions apply to In Path Equipment (IPE) that may be in the 64 kbits/s circuit, such as DCME or echo canceller equipment:

the monitoring of TFO negotiation messages-which involves the repetition of LSB bit 8 one time out of 16 (TFO establishment mode, i.e. reproduce at the output of the IPE the detected message)

the capability to go full or sub-64 kbits/s transparent mode and to resume normal operation based on TFO negotiation messages the capability to monitor and alter TFO speech frame control information (optional)

the capability to insert TFO negotiation messages (optional)

No assumption has been made with respect to the interaction between call set-up as seen by the MSC and TFO. This means that the initial working assumption is that TFO works independently of the Call Control in the MSC, using only a mechanism internal to the BSS to activate and de-activate TFO operation.

In the TFO establishment phase, a request for TFO, the TFO_REQ message, is sent using bit stealing on bit 8, by stealing one bit out of 16. This provides the least possible degradation of the PCM, since the TFO_REQ message is sent even in cases where TFO will not be possible e.g. MS to PSTN call. The monitoring of the TFO_REQ message can be performed by a BSS which is capable of TFO. Upon receipt of a TFO_REQ message, the BSS replies with an TFO_ACK message which can contain the following information:

system identification (GSM, . . . )

the current speech codec the list of supported speech codecs a random value that allows the detection of loop backs of a given BSS IPE which support TFO protocol need to first synchronise on "transparency patterns" contained in the in-band transmitted TFO messages (negotiation messages TFO_REQ, TFO_ACK) and in addition track some specific TFO message (Go transparent command, Go to normal) needed to set the transparency mode required in TFO established mode or return to normal operation. Having synchronised to a transparency pattern, the IPE should reproduce at its output the TFO message in order to ensure transparency of the in-band signalling path. Some additional delay with respect to normal operation of the IPE may be introduced by the IPE as far as the in-band signalling information is concerned but such delay should be a multiple of 20 ms. No delay should be introduced on other bits.

As part of the TFO establishment, if TFO can be successfully established (same codec type) then each TRAU sends TFO negotiation messages (Go transparent commands) which indicate to the In Path Equipment (IPE) along the BSS to BSS circuit the type of IPE transparency mode. The TFO speech frame then contains a "keep open" pattern that maintains the operation of the IPE as commanded This "keep open" pattern is part of the synchronisation pattern of each TRAU frame and thus does not require complete tracking of the TFO speech frames by the IPE (nevertheless the commands within the TFO negotiation messages should be checked continuously). IPE revert to normal operation in the case that the "keep open" pattern is absent for a short period or a new command "Go to normal" is received.

IPE which support TFO protocol set the transparency mode as indicated in the received Gotransparent command having reproduced the received Gotransparent command at its output. The IPE should simultaneously start to track the keep open pattern Then the bits corresponding to the "transparent" path are copied in the 64 kbits/s output stream of the equipment. The delay introduced by the IPE on the TFO contained in the transparent part of the 64 kbits/s should be less than or equal to the delay in normal operation.

These principles should be GSM independent, allowing other systems to use the same transparency principle. The behaviour of the IPE regarding the remaining part of the circuit can be either of the following: The IPE is speech transparent, meaning that the upper bits in the 64 kbits/s output stream should contain PCM speech, that speech being obtained by running the IPE in its normal way, possibly reproducing the PCM at the input. IPE should keep the same alignment as present at the input between transparent LSBs and upper bits containing the PCM speech, The IPE is non speech transparent, meaning that the IPE may strip the upper bits, if the IPE is the compressor part of an DCME. In such a case the peer IPE (the decompression part of the a DCME) should reproduce the speech from the received TFO frame). This implies that the DCME implements the decoding part of some GSM vocoders, and Half-duplex TFO capable IPE.

In the speech codec modification procedure the peer BSS is informed of the GSM speech codec versions supported by the sending information to the BSS (within the ongoing call) and attempting to align the codecs using predetermined rules and BSS procedures to make appropriate handover. The support of the informing and BSS internal modification procedures are optional for a BSS since it depends on the BSS internal capabilities. This means that TFO should be applicable even if the informing and modification capabilities are not supported by one of the two peer entities In this case, TFO will be available if both BSS happen to use the same speech codec version.

The exchanged parameters are the speech codec currently in use and the other possible codecs that can be used within the call. In the TFO request message (TFO_REQ), the BSS informs the fact that it supports TFO. A possible modification procedure is started when the TFO request message from the peer BSS has been detected. It is not synchronised explicitly on Call Set-up. If both BSS receive a TFO_REQ indicating that the same speech codec is used, the modification is not necessary and the BSS can move to the TFO established mode. If the speech codecs used on both sides are different, each BSS looks at the list of the acceptable speech codecs from the other BSS. Every BSS will try to use a codec based on the current speech codec, the list of locally acceptable speech codecs, and the list of remotely acceptable speech codecs. Each BSS then tries if it supports it to perform a change of codec via an intra-BSS (normally intra-cell) handover. When a handover has been performed, each BSS will reply to TFO_REQ by a new TFO_ACK message indicating the newly used speech codec. The process continues until either the same codec is used, or no more change of codec is possible according to the fixed rule.

There is a timer that protects the TFO establishment phase. The BSS, after the timer has elapsed, stops sending TFO request messages, but continues the monitoring of the peer entity. This provides that the communication is not degraded if TFO cannot be established. To resume the TFO establishment phase, it will be up to the peer entity to send a new TFO_REQ message to initiate a new attempt of establishment/modification of TFO e.g. when a handover has occurred. The BSS may change its speech codec, which procedure is internal to the BSS. It can be based on the use of O&M frames on the Abis interface or on the use of a specific TRAU to BSC interface or on some other method. When TFO operation has been established, the end to end delay is similar to a normal MS-MS call in TFO operation within a 20 ms range.

Thedegree of synchronisation obtainable between TRAUs depends on the kind of bit stealing used. For the 0.5 kbits/s case, there is a specific pattern one bit out of 16 on the LSB. For the 8 kbits/s, the synchronisation of GSM 08.61 is used, whilst for 16 kbits/s, the synchronisation of GSM 08.60 is used. Some sub-part of the synchronisation patterns can be also understood by the transmission equipment employed.

A TRAU in TFO established mode continuously monitors the synchronisation with the peer TRAU entity. In case of the loss of synchronisation, a timer is started. When the timer elapses, the TRAU sends normal PCM speech, reverts to non-TFO mode and starts re-establishment procedures.

With respect to the consideration of DTX, each direction is independent from the DTX point of view. This leads to the following scenarios for the transfer of speech in one direction:

| Uplink User A | Downlink User B |
| --- | --- |
| DTX | DTX |
| DTX | no DTX |
| no DTX | DTX |
| no DTX | no DTX |

The sending BSS, when DTX is applied on the uplink direction, generates normal speech frames when no SID frame is received. When a SID frame is received in the uplink, the BSS sends a normal speech frame to the peer BSS. The fact that a TRAU frame is a SID frame is indicated to the peer BSS. When uplink DTX is applied and nothing is received from the MS by the BTS, i.e. during comfort noise generation, normal speech frames are sent to the peer BSS. The fact that comfort noise generation is applied is indicated to the peer BSS. Based on this information, the receiving BSS can perform the best action depending on its mode DTX/no-DTX. If DTX is applied, it is considered best to re-use the SID frame that was received by the peer BSS, even if it means shifting in time the sending of the frame (because both radio physical layers are not synchronised). In the case that a BSS has received a bad frame in the uplink direction, then it will form a normal speech frame which is sent to the peer BSS. The fact that it was a bad frame that has been rebuilt is indicated to the peer BSS (BFI indication).

The bridging of a communication in the MSC can potentially interfere with TFO. The conference bridge will prevent TFO operation as long as it is present. If the bridge is present, the TFO synchronisation pattern should be lost and both TRAUs should revert to non-TFO. TFO operation will start again from the start when the bridge is removed (handover is performed). Since the radio interface is not modified, there is no compatibility issue with the MS. It is up to the second TRAU to make sure that what it sends to the BTS is compatible with the existing. The compatibility issue is with end systems not supporting TFO. The TFO negotiation message synchronisation patterns should be chosen such that no other system uses such a pattern for another purpose, and that this pattern cannot be generated by a peer entity which is not supporting TFO. This does not preclude other systems than GSM to use TFO since the type of system is part of the negotiation mechanism.

Supplementary and basic services that modify the configuration of a communication are possible: One example of a Supplementary Service is Explicit Call Transfer, where a MS to MS communication can result in a MS to non-MS communication. Similarly, in a communication where user A is a Mobile user and User B is not a Mobile user, the communication can be transferred and can become a communication between user A and user C where both are Mobile users. One example of Basic Service is Alternate speech and data, where TFO should not degrade the transitions between speech and data. More generally, the identified interactions are all related to the transitions between a configuration where TFO is possible (and potentially used) and a configuration where TFO is not possible.

Figure 10:
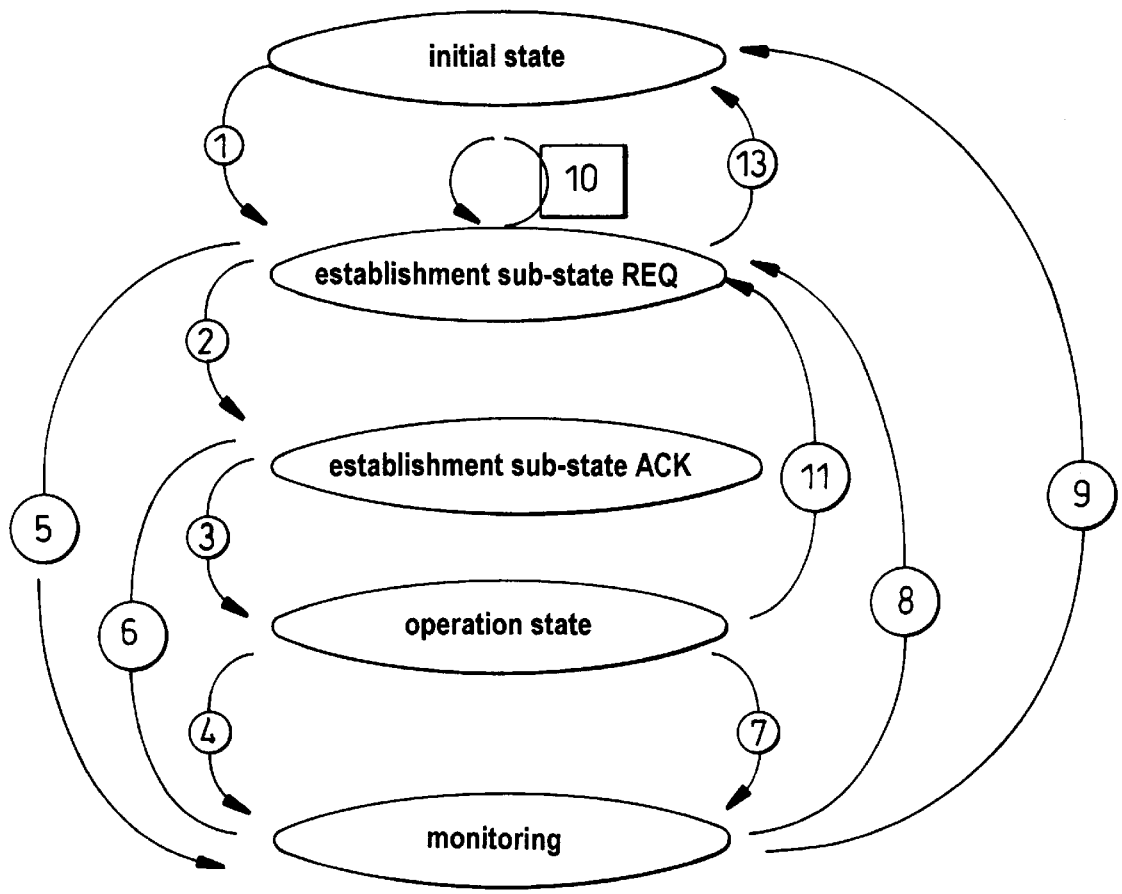

FIG. 10, by way of a summary details the protocol states of a system in accordance with the present invention.

Protocol states machine
1: speech detected from the BTS
2: TREQ or TLISTE received from distant TRAU
3: TACK or TLISTE received
4: loss of synchronisation or in-call modification
5: Timer Tini_detect elapses (no TFO capability at remote end)
6: codecs different or Tack_detect elapses
8: TREQ received from distant TRAU
9: end of speech from BTS
10: in-call modification
11: in-call modification
13: end of speech

What is claimed is:

1. A method of setting up a wireless communications link between two subscriber radio stations which each communicate with a respecting base station by the use of a selected one of several codecs;
   the method comprising:
      the signalling by each subscriber radio station to the other subscriber radio station of the codecs supported between each subscriber radio station and base station by said each subscriber radio station; and
      determining an appropriate codec for each subscriber radio station and base station pair, as deemed necessary based upon the signalling information,
      wherein the determination of an appropriate codec is made with reference to data provided in the form of a look-up table;
      wherein the look-up table takes into account:
         the codec presently employed by a subscriber radio station in establishing a call;
         the codecs supported by each subscriber radio station to base station link;
         the look-up table determining which codecs should be employed between each subscriber radio station and base station; and, changing the codec presently in use by either one or both of the subscriber radio stations as determined by the look-up table wherein, in the instance that the codecs supported between the two subscriber radio stations are common, tandem free operation is established, whereby the quality of the link is maximised.

2. A method according to claim 1 wherein the wireless communications link is a GSM link and the selection of an appropriate codec is made with reference to data provided in the form of a look-up table in accordance with table 1.

3. A method according to claim 1 wherein the subscriber radio stations are selected from the group comprising mobile radio stations and fixed wireless access stations.

4. A method according to claim 1 wherein the respective base stations are the same base station.

5. A method according to claim 1 wherein the second subscriber radio station is represented by a voice messaging equipment which stores speech data in compressed form.

6. A method of setting up a wireless communications link between two subscriber radio stations which each communicate with a respective base station by the use of a selected one of several codecs;
   wherein each of said stations has the capability of using at least one codec
   the method comprising:
      the signalling by each subscriber radio station to the other subscriber radio station of the codecs supported by said each subscriber radio station; and
      selecting an appropriate codec based upon the signalling information with reference to data relating to the codec capabilities of the subscriber radio stations such that, if there is a single codec supported by both subscriber radio stations then that codec is employed and, in the case that at least two common codecs are supported, then the codec providing the preferred data rate is selected;
      wherein the wireless communications link is a GSM protocol based link and the selection of an appropriate codec is made with reference to data provided in the form of a look-up table in accordance with claim 1;
      whereby the quality of the link is maximised.

7. A method according to claim 6 wherein the subscriber radio stations are selected from the group comprising mobile radio stations and fixed wireless access stations.

8. A method according to claim 6 wherein, in the case that there are at least two codecs that are commonly supported, then the codec providing the most efficient signal transmission is selected.

9. A method according to claim 6 wherein, in the case that there are at least two codecs that are commonly supported, then the codec providing the highest signal rate is selected.

10. A method according to claim 6 wherein, in the case that there are at least two codecs that are commonly supported, then the codec providing the best signal quality possible is selected.

11. A method according to claim 6 wherein, in the case that there are at least two codecs that are commonly supported, then the codec providing optimal use of the presently available resources of the system is selected.

12. A method according to claim 1 wherein, in the case that there are at least two codecs that are commonly supported, then the codec providing the most efficient signal transmission is selected.

13. A method according to claim 1 wherein, in the case that there are at least two codecs that are commonly supported, then the codec providing the highest signal rate is selected.

14. A method according to claim 1 wherein, in the case that there are at least two codecs that are commonly supported, then the codec providing the best signal quality possible is selected.

15. A method according to claim 1 wherein, in the case that there are at least two codecs that are commonly supported, then the codec providing optimal use of the presently available resources of the system is selected.

16. A method of setting up a wireless communications link between two subscriber radio stations which each communicate with a respective base station by the use of a selected one of several codecs;
   wherein each terminal has the capability of using at least one codec the method comprising:
      the signalling by each subscriber radio station to the other subscriber radio station of the codecs supported by said subscriber radio station; and
      selecting an appropriate codec based upon the signalling information with reference to data relating to the codec capabilities of the subscriber radio stations such that: in the case of there only being a single codec commonly supported by both subscriber radio stations then that codec is employed and,
      in the case that there are at least two codecs that are commonly supported, then the codec providing a preferred transmission rate is selected,
      wherein the wireless communications link is a GSM protocol based link and the selection of an appropriate codec is made with reference to data provided in the form of a look-up table in accordance with claim 1;
      whereby the quality of the link is maximised.

17. A method according to claim 16 wherein, in the case that there are at least two codecs that are commonly supported, then the codec providing the most efficient signal transmission is selected.

18. A method according to claim 16 wherein, in the case that there are at least two codecs that are commonly supported, then the codec providing the highest signal rate is selected.

19. A method according to claim 16 wherein, in the case that there are at least two codecs that are commonly supported, then the codec providing the best signal quality possible is selected.

20. A method according to claim 16 wherein, in the case that there are at least two codecs that are commonly supported, then the codec providing optimal use of the presently available resources of the system is selected.

21. A method according to claim 16 wherein the radio terminals are selected from the group comprising mobile radio stations and fixed wireless access stations.

22. A method according to claim 16 wherein the respective base stations are the same base station.

23. A system operable to initiate a wireless communications link, comprising first and second subscriber radio stations, each subscriber radio station being operable to communicate via a base station, the two subscriber radio stations each being operable to communicate with a respective base station by the use of a selected one of several codecs; wherein,
   in the setting up of a wireless communications link between first and second subscriber radio stations the signalling by each subscriber radio station to the other subscriber radio station of the codecs supported by said each subscriber radio station;
   and selecting an appropriate codec based upon the signalling information with reference to data relating to the codec capabilities of the terminals such that, if there is a single codec supported by both subscriber radio stations then that codec is employed and, in the case that at least two common codecs are supported, then the codec providing a preferred transmission rate is selected,
   wherein the wireless communications link is a GSM protocol based link and the selection of an appropriate codec is made with reference to data provided in the form of a look-up table in accordance with claim 1;
   whereby the quality of the link is maximised.

24. A method according to claim 23 wherein, in the case that there are at least two codecs that are commonly supported, then the codec providing the most efficient signal transmission is selected.

25. A method according to claim 23 wherein, in the case that there are at least two codecs that are commonly supported, then the codec providing the highest signal rate is selected.

26. A method according to claim 23 wherein, in the case that there are at least two codecs that are commonly supported, then the codec providing the best signal quality possible is selected.

27. A method according to claim 23 wherein, in the case that there are at least two codecs that are commonly supported, then the codec providing optimal use of the presently available resources of the system is selected.

28. A subscriber radio station for a wireless communications system, comprising a plurality of subscriber radio stations, wherein a subscriber radio station is arranged to communicate with a second subscriber radio station via a respective base station by the use of a selected one of several codecs; wherein; in the setting up a wireless communications link between two subscriber radio stations which each communicate with a respective base station by the use of a selected one of several codecs;
   wherein each terminal has the capability of using at least one codec the method comprising
   the signalling by each subscriber radio station to the other subscriber radio station of the codecs supported by said each subscriber radio station; and
   selecting an appropriate codec based upon the signalling information with reference to data relating to the codec capabilities of the terminals such that, if there is a single codec supported by both subscriber radio stations then that codec is employed and, in the case that at least two common codecs are supported, then the codec providing a preferred transmission rate is selected,
   wherein the wireless communications link is a GSM protocol based link and the selection of an appropriate codec is made with reference to data provided in the form of a look-up table in accordance with claim 1;
   whereby the quality of the link is maximised.

29. A method according to claim 28 wherein, in the case that there are at least two codecs that are commonly supported, then the codec providing the most efficient signal transmission is selected.

30. A method according to claim 28 wherein, in the case that there are at least two codecs that are commonly supported, then the codec providing the highest signal rate is selected.

31. A method according to claim 28 wherein, in the case that there are at least two codecs that are commonly supported, then the codec providing the best signal quality possible is selected.

32. A method according to claim 28 wherein, in the case that there are at least two codecs that are commonly supported, then the codec providing optimal use of the presently available resources of the system is selected.

33. A method of setting up a wireless communications link between two subscriber radio stations which each communicate with a respective base station by the use of a selected one of several codecs;

the method comprising:

the signalling by each subscriber radio station to the other subscriber radio station of the codecs supported between each subscriber radio station and base station by said each subscriber radio station; and determining an appropriate codec for each subscriber radio station and base station pair, as deemed necessary based upon the signalling information, wherein the determination of an appropriate codec is made with reference to data provided in the form of a look-up table;

wherein the look-up table takes into account:

the codec presently employed by a subscriber radio station in establishing a call;

the codecs supported by each subscriber radio station to base station link;

the look-up table determining which codecs should be employed between each subscriber radio station and base station; and wherein the look-up table takes into account the use of the system whereby the set of codecs determined are optimal for the presently available resources of the system.

34. A method of maintaining a wireless communications link between two subscriber radio stations which each communicate with a respective base station by the use of a selected one of several codecs; wherein the link circumstances have changed, the method comprising:

the signalling by each subscriber radio stations to the other subscriber radio stations of the codecs supported between each subscriber radio station and base station by said each subscriber radio station; and determining an appropriate codec for each subscriber radio station and base station pair, as deemed necessary based upon the signalling information, wherein the determination of an appropriate codec is made with reference to data provided in the form of a look-up table;

wherein the look-up table takes into account:

the codec presently employed by a subscriber radio station in establishing a call;

the codecs supported by each subscriber radio station to base station link;

the look-up table determining which codecs should be employed between each subscriber radio station and base station;

and, changing the codec presently in use by either one or both of the subscriber radio stations as determined by the look-up table wherein, in the instance that the codecs supported between the two subscriber radio stations are common, tandem free operation is established, in the case that there are at least two codecs that are commonly supported, then the codec providing a preferred transmission rate is selected, whereby the quality of the link is maximised.

35. A method according to claim 34 wherein the subscriber radio stations are selected from the group comprising mobile radio stations and fixed wireless access stations.

36. A method according to claim 34 wherein the wireless communications link is a GSM link and the selection of an appropriate codec is made with reference to data provided in the form of a look-up table in accordance with table 1.

37. A method according to claim 34 wherein the second subscriber radio station is represented by a voice messaging equipment which stores speech data in compressed form.

38. A method according to claim 34 wherein the second subscriber radio station is represented by a compression equipment used to save transmission costs in the network infrastructure.

39. A method according to claim 34 wherein, in the case that there are at least two codecs that are commonly supported, then the codec providing the most efficient signal transmission is selected.

40. A method according to claim 34 wherein, in the case that there are at least two codecs that are commonly supported, then the codec providing the highest signal rate is selected.

41. A method according to claim 34 wherein, in the case that there are at least two codecs that are commonly supported, then the codec providing the best signal quality possible is selected.

42. A method according to claim 34 wherein, in the case that there are at least two codecs that are commonly supported, then the codec providing optimal use of the presently available resources of the system is selected.

43. A system operable to initiate a wireless communications link, comprising first and second subscriber radio stations, each subscriber radio station being operable to communicate via a base station, the two subscriber radio stations each being operable to communicate with a respective base station by the use of a selected one of several codecs; wherein, in the setting up of a wireless communications link between first and second subscriber radio stations each subscriber radio station signals to the other subscriber radio station of the codecs supported between each subscriber radio station and base station by said each subscriber radio station; and an appropriate codec for each radio station and base station pair is determined, as deemed suitable based upon the signalling information, wherein the determination of an appropriate codec is made with reference to data provided in the form of a look-up table;

wherein the look-up table takes into account:

the codec presently employed by a subscriber radio station in establishing a call;

the codecs supported by each subscriber radio station to base station link;

the look-up table determining which codecs should be employed between each subscriber radio station and base station;

and, changing the codec presently in use by either one or both of the subscriber radio stations as determined by the look-up table wherein, in the instance that the codecs supported between the two subscriber radio station are common, tandem free operation is established, and, in the case that there are at least two codecs that are commonly supported, then the codec providing a preferred transmission rate is selected, whereby the quality of the link is maximised.

44. A system according to claim 43 wherein, in the case that there are at least two codecs that are commonly supported, then the codec providing the most efficient signal transmission is selected.

45. A system according to claim 43 wherein, in the case that there are at least two codecs that are commonly supported, then the codec providing the highest signal rate is selected.

46. A system according to claim 43 wherein, in the case that there are at least two codecs that are commonly supported, then the codec providing the best signal quality possible is selected.

47. A system according to claim 43 wherein, in the case that there are at least two codecs that are commonly supported, then the codec providing optimal use of the presently available resources of the system is selected.

48. A subscriber radio station for a wireless communications system, comprising a plurality of subscriber radio stations, wherein a subscriber radio station is arranged to communicate with a second subscriber radio station via a respective base station by the use of a selected one of several codecs; wherein;

in the setting up of a wireless communications link between the and second subscriber radio stations each subscriber radio station signals to the other subscriber radio station of the codecs supported between each subscriber radio station and base station by said each subscriber radio station; and an appropriate codec for each radio station and base station pair is determined, as deemed suitable based upon the signalling information, wherein the determination of an appropriate codec is made with reference to data provided in the form of a look-up table;

wherein the look-up table takes into account:
the codec presently employed by a subscriber radio station in establishing a call;
the codecs supported by each subscriber radio station to base station link;
the look-up table determining which codecs should be employed between each subscriber radio station and base station;
changing the codec presently in use by either one or both of the subscriber radio stations as determined by the look-up table wherein, in the instance that the codecs supported between the two subscriber radio station are common, tandem free operation is established, and, in the case that there are at least two codecs that are commonly supported, then the codec providing a preferred transmission rate is selected, whereby the quality of the link is maximised.

49. A method according to claim 48 wherein, in the case that there are at least two codecs that are commonly supported, then the codec providing the most efficient signal transmission is selected.

50. A method according to claim 48 wherein, in the case that there are at least two codecs that are commonly supported, then the codec providing the highest signal rate is selected.

51. A method according to claim 48 wherein, in the case that there are at least two codecs that are commonly supported, then the codec providing the best signal quality possible is selected.

52. A method according to claim 48 wherein, in the case that there are at least two codecs that are commonly supported, then the codec providing optimal use of the presently available resources of the system is selected.

* * * * *

UNITED STATES PATENT AND TRADEMARK OFFICE
CERTIFICATE OF CORRECTION

PATENT NO. : 6,108,560

DATED : August 22, 2000

INVENTOR(S) : William Navarro, et al

It is certified that error appears in the above-identified patent and that said Letters Patent is hereby corrected as shown below:

On the Title Page, Item [75] the inventors name should read ---- Navarro ----.

Signed and Sealed this

Twenty-ninth Day of May, 2001

Attest:

NICHOLAS P. GODICI

Attesting Officer     Acting Director of the United States Patent and Trademark Office